(12) United States Patent
Andreoli et al.

(10) Patent No.: US 11,940,373 B2
(45) Date of Patent: Mar. 26, 2024

(54) METHOD, SYSTEM AND TEST ARTICLE FOR ESTIMATING THE EXTENT OF A FRICTION INTERACTION BETWEEN A CONVEYOR AND TRANSPORTED ARTICLES

(71) Applicant: REXNORD FLATTOP EUROPE S.R.L., Correggio (IT)

(72) Inventors: Andrea Andreoli, Modena (IT); Kaur Parmjit, Soliera (IT)

(73) Assignee: Rexnord FlatTop Europe S.R.L., Corregio (IT)

( * ) Notice: Subject to any disclaimer, the term of this patent is extended or adjusted under 35 U.S.C. 154(b) by 317 days.

(21) Appl. No.: 17/423,329

(22) PCT Filed: Feb. 24, 2020

(86) PCT No.: PCT/EP2020/054752
§ 371 (c)(1),
(2) Date: Jul. 15, 2021

(87) PCT Pub. No.: WO2020/173864
PCT Pub. Date: Sep. 3, 2020

(65) Prior Publication Data
US 2022/0099559 A1  Mar. 31, 2022

(30) Foreign Application Priority Data

Feb. 28, 2019  (IT) .......................... 102019000002903

(51) Int. Cl.
*G01N 19/02* (2006.01)
*B65G 43/02* (2006.01)
*B65G 45/02* (2006.01)

(52) U.S. Cl.
CPC ............. *G01N 19/02* (2013.01); *B65G 43/02* (2013.01); *B65G 45/02* (2013.01); *B65G 2201/0244* (2013.01); *B65G 2203/0208* (2013.01)

(58) Field of Classification Search
CPC ........ G01N 19/02; B65G 43/02; B65G 45/02; B65G 2201/0244; B65G 2203/0208; B65G 43/08
USPC ............................................................. 73/9
See application file for complete search history.

(56) References Cited

U.S. PATENT DOCUMENTS 3,053,371 A   9/1962 Fischer
4,813,266 A   3/1989 Nash
(Continued)

FOREIGN PATENT DOCUMENTS

CN   103048262 A   4/2013
CN   206832652 U   1/2018
(Continued)

OTHER PUBLICATIONS

Translation of EP-1967471-A1 (Year: 2008).*
PCT International Search Report and Written Opinion, PCT/EP2020/054752, dated May 4, 2020, 11 pages.

*Primary Examiner* — Nathaniel T Woodward
(74) *Attorney, Agent, or Firm* — Quarles & Brady LLP

(57) ABSTRACT

A method for estimating the extent of a friction interaction between a transport surface of an article conveyor and articles transported on the transport surface by providing a representative test article, associating an acceleration sensor with the test article so that the acceleration sensor is capable of measuring acceleration along a direction lying in a plane parallel to a support plane of the test article, placing the test article on the transport surface and having it transported by the article conveyor, so that the acceleration sensor measures at least an acceleration experienced by the test article along (Continued)

a direction lying in a plane parallel to the transport surface on which the test article rests, acquiring measurements of the acceleration along the direction, and estimating the extent of the friction interaction between the transport surface and the test article on the basis of the acquired measurements of the acceleration.

18 Claims, 6 Drawing Sheets

(56) References Cited

U.S. PATENT DOCUMENTS

| | | | | |
|---|---|---|---|---|
| 5,971,134 | A * | 10/1999 | Trefz | B65G 15/58 |
| | | | | 198/460.3 |
| 6,409,434 | B1 * | 6/2002 | Winther | B65G 47/91 |
| | | | | 406/88 |
| 2007/0119686 | A1 * | 5/2007 | Divisi | G01N 19/02 |
| | | | | 198/502.1 |
| 2011/0264300 | A1 | 10/2011 | Tuononen | |
| 2022/0242676 | A1 | 8/2022 | Tamura et al. | |

FOREIGN PATENT DOCUMENTS

| | | | |
|---|---|---|---|
| DE | 10122808 A1 | 11/2002 | |
| DE | 102009043525 A1 | 10/2010 | |
| DE | 112020002456 T5 | 1/2022 | |
| EP | 1967471 A1 * | 9/2008 | ............ B65G 43/02 |
| WO | 2010063040 A2 | 6/2010 | |
| WO | 2015160486 A1 | 10/2015 | |
| WO | 2017150976 A1 | 9/2017 | |
| WO | 2018160218 A1 | 9/2018 | |

* cited by examiner

METHOD, SYSTEM AND TEST ARTICLE FOR ESTIMATING THE EXTENT OF A FRICTION INTERACTION BETWEEN A CONVEYOR AND TRANSPORTED ARTICLES

CROSS-REFERENCE TO RELATED APPLICATIONS

This application represents the national stage entry of PCT International Application No. PCT/EP2020/054752 filed on Feb. 24, 2020, which claims priority to Italian Patent Application IT 102019000002903 filed on Feb. 28, 2019, each of these applications is hereby incorporated herein by reference for all purposes.

TECHNICAL BACKGROUND

Field of Technique

The present disclosure generally relates to methods and systems for transporting articles on conveying surfaces of conveyors such as conveyor belts, conveyor mats, conveyor chains. More specifically, the present disclosure refers to methods and systems for the determination and possibly the control of the friction between am articles conveying surface of a conveyor and the articles transported on such conveying surface.

Brief Review of the State of the Art

In systems for conveying articles, the friction between an articles conveying surface, for example the surface of a conveyor belt, a conveyor mat, a conveyor chain, and the articles transported on such transport surface is an important parameter to be taken into consideration for the correct operation of the transport systems.

For example, in the conveying of articles such as containers for liquids, such as bottles, particularly plastic bottles, for example for drinks, conveyors are used comprising conveyor belts on which the bottles are deposited. At the end of a section of the transport path there may be collecting units that convey the bottles to subsequent treatments (for example to feed them to a labelling machine). The collecting units may comprise a pair of channeling guides defining a passage door that allows the passage of a limited number of bottles, for example, one bottle at a time. The bottles conveyed by the conveyor belt that continuously arrive the collecting unit, collide against the pair of channeling guides and accumulate in correspondence of the same, while only one bottle at a time can pass through the door and be channeled towards the successive treatment. Consequently, since the bottles remain accumulated in correspondence of the channeling guides while the underlying conveyor belt continues to translate without stopping, the bottles must necessarily slide on the conveyor belt.

To facilitate the sliding and prevent the bottles from falling due to the friction between them and the surface of the conveyor belt, it is known to lubricate the upper surface of the conveyor belt on which the bottles are transported.

The upper surface of the conveyor belt can be lubricated by feeding a lubricating fluid film (for example soaps—surfactants—in aqueous solution, or silicone oils, or micro particles of lubricating substances, e.g. of teflon, in liquid suspension) on the conveyor belt.

A lubricant dispenser can be arranged upstream of the conveyor belt, which is fed with a predetermined amount of lubricant (usually a predetermined amount of lubricant per unit of time or a predetermined amount of lubricant per unit of length travelled by the conveyor belt); the lubricant dispenser evenly distributes the lubricant on the conveyor belt.

In some known conveyors it is not possible to automatically adjust the amount of lubricant delivered on the conveyor belt in order to adapt to variations in the conditions of friction between the conveyor belt and the articles. This represents a significant drawback, since the friction coefficient is a function of both the materials that come into contact and the type and quality of the lubricant, but it is also greatly affected by other factors that can vary considerably over time, such as temperature and humidity of the environment in which the conveyor is disposed. In addition to this, the conveyor belt must always be properly lubricated because if the lubrication was excessive (compared to the instantaneous friction coefficient between the conveyor belt and the transported bottles), the bottles would slide on the conveyor belt and would not be able to overcome even small slopes of the conveyor belt, while if the lubrication was insufficient (as compared to the instantaneous coefficient of friction between the conveyor and the bottles), the bottles (which are braked by, and accumulates in correspondence of the channeling guides of the collecting unit) would overturn.

Completely similar problems are also experienced at transitions between two conveyor belts that move at different speeds.

US 2007/119686 A1 describes a conveyor comprising a conveyor belt to which a lubricant dispensing device is associated. The conveyor further comprises a device for measuring a quantity proportional to the friction coefficient between the conveyor belt and the bottles and connected to control means for controlling the lubricant dispensing device so as to adjust the amount of lubricant in order to maintain the measured quantity within a predetermined range. The conveyor belt lubrication adjustment process consists of measuring a quantity indicative of the coefficient of friction between the conveyor belt and the bottles and controlling the supply of the lubricant on the conveyor belt so as to maintain such a quantity within a predetermined range. The friction coefficient measuring device comprises a slider connected by elastic means (a spiral spring) to a sensor capable of measuring the force acting on it and provided with a contact portion slidably associated with the conveyor belt.

WO 2017/150976 A1, in the name of the same present Applicant, describes a method and system for the transport of articles, in which a surface of the conveyor moves at a conveyor speed and the articles are supplied on the surface of the conveyor in an area of measurement. The articles move through the measuring zone with an article speed which is at least initially different from the conveyor speed. A contact between the articles and the surface of the conveyor movable relative to the articles themselves causes the articles to accelerate or decelerate in the measuring area according to a coefficient of kinetic friction between them. A control signal is indicative of the acceleration or deceleration of the articles in the measuring area. The kinetic friction coefficient is controlled on the basis of the control signal to maintain the acceleration or deceleration within a predetermined threshold range. WO 2017/150976 A1 proposes an optical measurement of the acceleration of one or more articles, for example by means of a camera for recording images of moving articles: from the recorded images it is possible to derive the position and acceleration of the articles.

SUMMARY OF THE SOLUTION OF THE PRESENT DISCLOSURE

Concerning the solution described in US 2007/119686 A1, it has been observed that the system described therein is based on a sensor which can occupy precious space on the conveyor belt and can require a substantial adaptation of the transport system. In addition, the sensor only detects friction in the contact position, which may not accurately reflect the friction in other parts of the conveyor belt, for example in adjacent positions.

The solution according to WO 2017/150976 A1, although satisfactory in many respects, is not entirely free from drawbacks. For example, the optical measurement of the acceleration of the transported articles by a camera to record the images of the produced articles in motion, and subsequently the processing of the recorded images necessary to derive the position and the acceleration of the articles, are computationally heavy processes and require relatively expensive equipment (cameras, image processors). Furthermore, the calculation of the acceleration of the transported articles, and therefore the estimation of the friction, is carried out only in a measuring area, which corresponds to an extremely limited section of a transport path of the articles.

The Applicant has addressed the problem of determining and possibly controlling friction between a transport surface and the transported articles, and has developed a method and a system which are alternative to those known and, it is believed, advantageous with respect to the same.

In particular, according to an aspect of the solution of the present disclosure, a method is provided for estimating the extent of a friction interaction between a transport surface of a conveyor of articles and articles transported on the transport surface.

The method comprises providing a test article representative of the articles of a batch of articles which are to be transported by the article conveyor.

The method comprises associating a sensor with the test article, said sensor comprising an acceleration sensor associated with the test article that is arranged to measure at least one acceleration along a direction lying in a plane that is oriented relative to a support surface of the test article.

The method comprises supporting the test article on a moving transport surface of a conveyor of articles.

The method comprises acquiring measurements of the at least one acceleration experienced by the test article being supported on the moving transport surface with the acceleration sensor.

The method comprises estimating the extent of the friction interaction between the transport surface and the test article on the basis of the measurements of the at least one acceleration acquired. For instance, the acceleration sensor of the sensor associated with the test article may be arranged to measure the at least one acceleration along a direction in the plane oriented parallel to the support plane of the test article defined by the transport surface. For example, the acceleration sensor may be arranged to measure a first acceleration along a first direction and/or a second acceleration along a second direction lying in the plane oriented parallel to said support plane of the test article. Additionally or alternatively, the acceleration sensor of the sensor associated with the test article may be arranged to measure the at least one acceleration along a direction in the plane oriented orthogonal to the support plane of the test article defined by the transport surface. For example, the acceleration sensor may be arranged to measure a third acceleration along a third direction lying in the plane oriented orthogonal to said support plane of the test article.

In exemplary and not limiting embodiments, the method may include associating to the article conveyor a monitoring system adapted to receive from the sensor associated with the test article the acceleration measurements performed by the acceleration sensor of the sensor associated with the test article when transported by the article conveyor, and a computing device for estimating the extent of the friction interaction between the transport surface and the test article on the basis of the acceleration measurements received.

In exemplary and not limitative embodiments, the method can include the step of storing the acceleration measurements performed by the acceleration sensor of the sensor associated with the test article in a memory associated with the sensor, in particular provided in the sensor, when the test article is conveyed by the article conveyor, and the step of providing to the monitoring system associated with the article conveyor the acceleration measurements stored in the memory.

In exemplary and not limitative embodiments, the method can include the step of transmitting the acceleration measurements performed by the acceleration sensor in wireless mode, in particular through a transmitter associated with the sensor, and receiving the transmitted acceleration measurements performed by the acceleration sensor in wireless mode, in particular in a receiver of the monitoring system. Preferably, the transmitter and/or receiver may form part of a communication interface, wherein the receiver is capable of receiving in wireless mode the acceleration measurements performed by the acceleration sensor from the transmitter associated with the sensor.

In embodiments, the test article representative of the articles of the batch of articles that must be transported by the article conveyor is an article of the same material and/or of the same size and/or of the same weight and/or of the same shape as the articles of the batch of articles.

In embodiments, the method may also include controlling the coefficient of friction on the basis of information received by said means for estimating the value of the coefficient of friction. Said controlling the coefficient of friction may include keeping the acceleration or deceleration of the test article within a predetermined range. For instance, the extent of the friction interaction between the transport surface and the test article may be controlled on the basis the acquired measurements of the at least one acceleration by keeping the acceleration or deceleration of the test article within a predetermined range.

In embodiments, controlling the coefficient of friction may include distributing lubricant on the conveying surface and/or on the articles that have to be conveyed and/or cleaning the conveying surface and/or the articles to be transported. For example, the extent of the friction interaction between the transport surface and the test article may be controlled by distributing lubricant on the transport surface and/or on articles to be transported on the transport surface.

In embodiments, said controlling the friction coefficient comprises cleaning the transport surface and/or requesting a replacement of the component of the article conveyor defining the transport surface. For instance, the extent of the friction interaction between the transport surface and the test article may be controlled by cleaning the transport surface and/or requesting a replacement of at least one component of the conveyor of articles defining the transport surface.

In embodiments, the method may further comprise:
  detecting the position of the test article along a transport path of the article conveyor, and
  associating the detected position of the test article with the acceleration measurements performed by the acceleration sensor of the sensor associated with the test article.

According to another aspect of the present disclosure, a system is provided for estimating a friction coefficient between a transport surface of a conveyor of articles and articles transported on the transport surface.

The system includes:
  a test article representative of the articles of a batch of articles to be transported by the article conveyor;
  a sensor associated with the test article.

The sensor associated with the test article includes an acceleration sensor associated with the test article that is arranged to measure at least one acceleration along a direction lying in a plane that is oriented relative to a support plane of the test article.

The system comprises a monitoring system for acquiring measurements of said at least one acceleration performed by the acceleration sensor of the sensor associated with the test article when, in use, the test article is supported on a moving transport surface of an article conveyor. The system comprises a computing device associated with the monitoring system for estimating the extent of the friction interaction between the transport surface and the test article on the basis of the acquired measurements of the at least one acceleration.

Advantageously, the sensor may comprise a memory for storing the acceleration measurements. The monitoring system may be configured to read out the stored acceleration measurements from the memory to estimate the extent of friction interaction using the computing device.

The sensor associated with the test article can comprises a communication interface suitable for transmitting acceleration measurements performed by the acceleration sensor in wireless mode.

The system may further comprise a receiver adapted to receive from the sensor communication interface associated with the test article the acceleration measurements performed by the acceleration sensor of the sensor associated with the test article when, in operation, the test article is resting on the transport surface and is transported by the article conveyor.

The system may comprise means for estimating a value of the friction coefficient between the transport surface and the test article on the basis of the received acceleration measurements.

A further aspect of the solution of the present disclosure provides a transport system or conveyor comprising a system for estimating a friction coefficient between a transport surface of a conveyor of articles and articles transported on the transport surface in accordance with the previous aspect.

The system may comprise a transmitter associated with the sensor that is configured to transmit the acceleration measurements performed by the acceleration sensor, in particular in wireless mode, and a receiver associated with the monitoring system that is configured to receive the acceleration measurements transmitted by the transmitter, in particular in wireless mode. In particular, the transmitter and/or receiver may form part of the communication interface.

The system may comprise a controller and a friction coefficient adjustment device controlled by the controller based on the estimated extent of the friction interaction between the transport surface and the test article. For example, the friction coefficient adjustment device may include a dispenser for distributing lubricant on the transport surface and/or on articles to be transported on the transport surface. Additionally or alternatively, the friction coefficient adjustment device may include a maintenance apparatus for cleaning the transport surface and/or requesting replacement of components of the conveyor of articles defining the transport surface, such as a conveyor module or hinge pin.

The system may comprise a tracking system that is configured to track a position of the sensor along a transport path of the conveyor of articles.

Furthermore, another aspect of the solution of the present disclosure provides for a test article representative of articles of a batch of articles that are to be transported by a conveyor of articles, in particular for use in the method and/or as part of the system including features as described above. Preferably, the test article is of the same material, dimensions, weight and/or shape as the articles in the batch of articles. The test article is provided with a sensor comprising an acceleration sensor that is arranged to measure at least one acceleration along a direction lying in a plane that is oriented relative to a support plane of the test article.

BRIEF DESCRIPTION OF THE DRAWINGS

These and other features and advantages of the solution of the present disclosure will result evident from the reading of the following detailed description of exemplary and non-limiting embodiments thereof. For a better understanding of what will be described, the following detailed description will make reference to the attached drawings, in which.

DETAILED DESCRIPTION OF EXEMPLARY EMBODIMENTS

Figure 1:
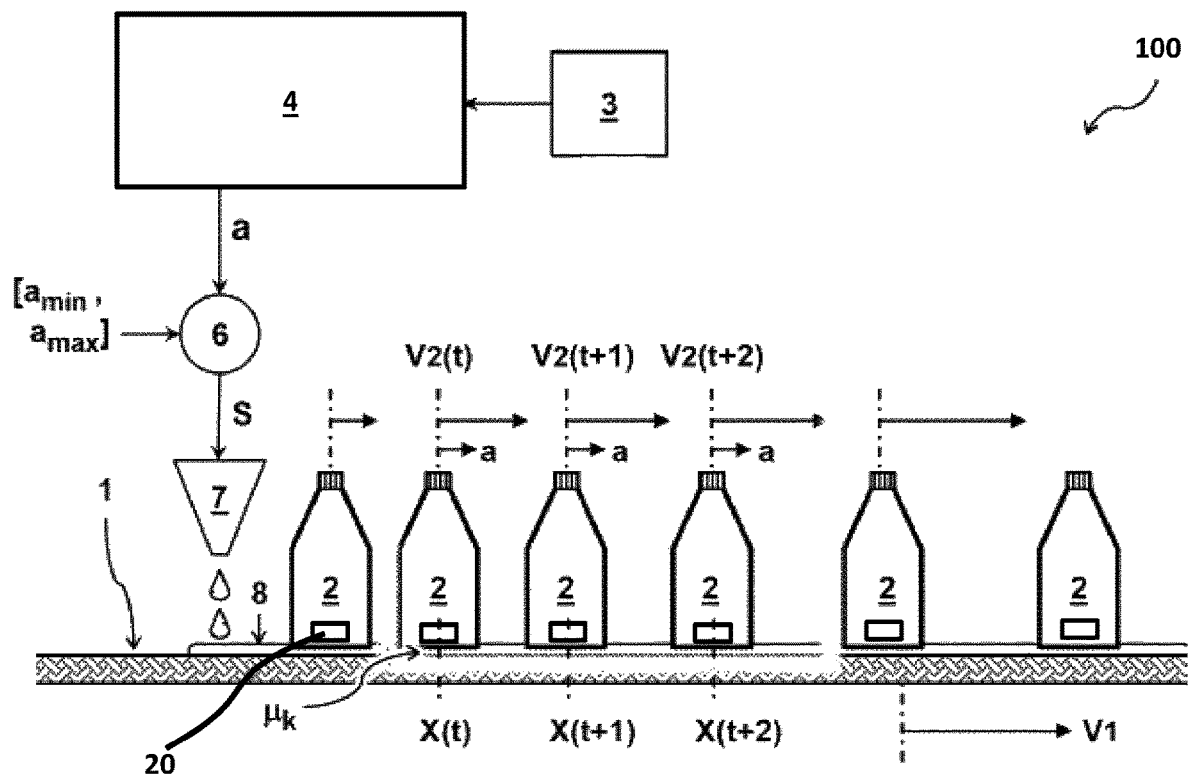
FIG. 1 schematically shows an embodiment of a articles transport system in accordance with the solution referred to in the present disclosure.

Before proceeding to the detailed description of the exemplary and non-limitative embodiments of the solution of the present disclosure, it is desired to point out the following.

In the following detailed description, in some cases and in order to not make obscure the understanding of the solution referred to in this disclosure, detailed descriptions of devices and methods known in the art will be omitted.

The terminology used to describe particular embodiments in detail is not intended to limit the solution described in this disclosure. The singular forms "a" and "the" are also meant to include the plural forms, unless the context clearly indicates the opposite. The term "and/or" is to be understood as including all combinations of one or more of the associated listed elements. The terms "comprises" and/or "comprising", "includes" and/or "including" specify the presence of the stated features but do not preclude the presence or addition of one or more other features.

It will also be understood that when a particular phase of a method is indicated as following another phase, it can directly follow said other phase or one or more intermediate phases can be performed before carrying out the particular phase, unless otherwise specified. In the same way it will be understood that when a connection between structures or components is described, this connection can be established directly or through intermediate structures or components unless otherwise specified.

In the drawings, the absolute and relative dimensions of systems, components, layers and regions may be exaggerated for clarity.

The embodiments may be described with reference to schematic and/or cross-sectional illustrations of possible idealized embodiments and intermediate structures of the solution of the present disclosure. In the description and in the drawings, the same alphanumeric references refer to identical or similar elements.

Relative terms, as well as their derivatives, shall be interpreted making reference to the orientation as described or shown in the drawing under discussion. These relative terms are used for convenience of description and do not require that the system is necessarily built or managed in a particular orientation, unless otherwise specified.

Referring now to the drawings, FIG. 1 schematically illustrates one embodiment of a transport system 100 for transporting articles. In particular, FIG. 1 shows a (short) section of an article conveyor.

In one embodiment, the conveyor system 100 comprises a conveyor surface 1 (e.g. the top surface of a conveyor belt) configured to move at a conveyor speed V1 (relative to a reference system not shown, e.g. the earth's surface).

The figure shows an article 2 which is resting on the conveyor surface 1 and which is transported by the transport system 100. During the transport thereof, the article 2 happens to be located, in different time instants t, t+1, t+2, in different positions, for example the positions X(t), X(t+1), X(t+2).

The article 2 moves (with respect to the reference system) with an article speed V2. The article speed V2 is at least initially (where "initially" means a certain time interval starting from the moment when the article 2 is placed on the conveyor surface 1) different from the conveyor speed V1. The contact between the article 2 and the conveyor surface 1 moving at the conveyor speed V1 causes the article 2 to accelerate or decelerate (depending on the initial value of the article speed V2 at the moment in which the article 2 is placed on the conveyor surface 1). Therefore, the article speed V2 is time dependent (V2 (*t*)) and for example in each of the different positions X(t), X(t+1), X(t+2), and therefore at each time instant t, t+1, t+2, the article 2 has a respective article speed V2 equal to V2(*t*), V2(*t*+1), V2(*t*+2). The acceleration or deceleration of the article 2 in the direction of movement of the conveyor surface 1, indicated by a in the figure, depends on a kinetic friction coefficient between the article 2 and the conveyor surface 1.

In the example shown in FIG. 1, the article 2 is a bottle. As will be understood, the nature of the article 2 is not limiting for the solution described in this disclosure, which solution generally applies to articles of any nature, such as for example cans or boxes or packs of articles (for example packs of bottles).

Figure 2:
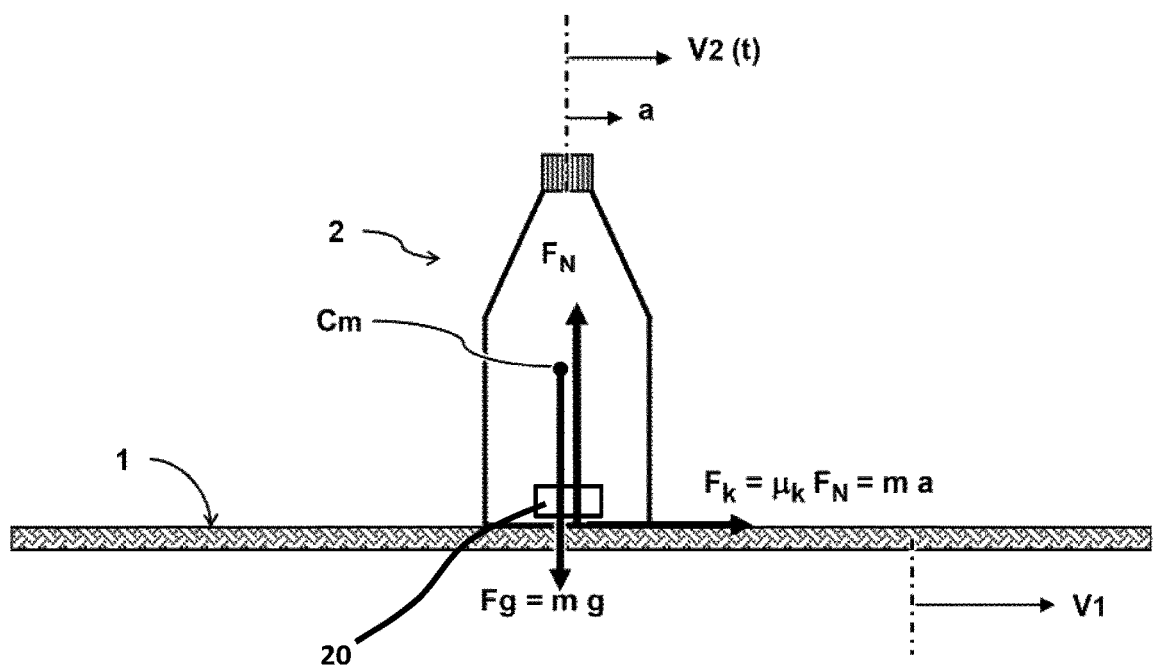
FIG. 2 summarizes an analysis of frictional forces between a transported article and a surface of a conveyor belt system of FIG. 1.

Without pretensions of theoretical rigorousness and being understood that the solution of the present disclosure is not to be bound to theory, FIG. 2 schematically illustrates an analysis of the friction forces $F_k$ between the article 2 and the conveyor surface 1. When two objects move relative to one another with mutual friction (like a sledge on the ground) a kinetic (or dynamic) friction originates. The kinetic friction coefficient, typically indicated with $\mu_k$, is usually lower than the static friction coefficient for the same materials. The gravitational force (weight force) $F_g$ acting on the center of mass Cm of the article 2 assumed to have mass m is equal to:

$$F_g = m \cdot g$$

where g is the acceleration of gravity, almost constant on the earth's surface and equal to about 9.8 m/s². When the article 2 is standing upright on the conveyor surface 1, the article 2 experiments a normal reaction force $F_N$ exerted by the conveyor surface 1, equal and opposite to the gravitational force $F_g$:

$$F_N = F_g.$$

When there is a relative movement between the article 2 and the conveyor surface 1 (i.e., when V2≠V1), between the article 2 and the conveyor surface 1 a kinetic friction force $F_k$ may act, which is proportional to the kinetic friction coefficient $\mu_k$ and the normal force $F_N$:

$$F_k = \mu_k \cdot F_N.$$

The kinetic friction force $F_k$ causes an acceleration of the article 2 as long as V2<V1, or a deceleration of the article 2 as long as V2>V1, according to the relation:

$$F_k = m \cdot a.$$

Combining the above equations it can be shown that the acceleration (or deceleration) of the article on the conveyor surface 1 is proportional to the kinetic friction coefficient $\mu_k$:

$$\mu_k \cdot F_N = m \cdot a$$

$$\mu_k \cdot m \cdot g = m \cdot a$$

$$\mu_k \cdot g = a$$

It will be appreciated that the kinetic friction coefficient $\mu_k$ can therefore be independent of the mass m of the article 2. In case the conveyor surface 1 is horizontal the gravitational force $F_g$ on the articles does not cause acceleration in the plane of the conveyor surface 1 and it can be assumed that all the acceleration or deceleration is generated by a resulting frictional force. Alternatively, on an inclined conveyor surface 1 (ascending or descending), the frictional forces can still be calculated from the acceleration taking into account the component of the gravitational force in the conveyor surface plane.

Thus, from the knowledge of the value of the acceleration (or deceleration) of the article on the conveyor surface 1 it is possible to infer the value of the kinetic friction coefficient $\mu_k$, proportional to the value of the acceleration (or deceleration) of the article on the conveyor surface 1:

$$\mu_k = a/g.$$

The article 2 shown in FIGS. 1 and 2 is a sample article, or test article (thus, in the example considered, a test bottle), which is intended to be a representative article, representative of the articles that the transport system 100 is intended to transport and which is used for monitoring the friction coefficient between the article 2 itself and the conveyor surface 1.

The test article 2 can be an article which, for shape, size, weight, material, is similar or identical to the articles that the transport system 100 is intended to transport. In particular, the test article 2 can be an article which has a lower portion of contact with the conveyor surface 1 similar or identical (in shape, size, material) to that of the articles that the transport system 100 is intended to carry. Unlike other articles to be conveyed, the test article 2 is equipped with a sensor 20. The sensor 20 is preferably associated with the test article 2 so as to substantially not alter its mass. In the case in which, as in the example considered, the articles to be transported and consequently the test article 2 are bottles, the sensor 20 can be installed inside the bottle, lying on the bottom, or it can be incorporated in a bottle cap which is mounted on the bottle constituting the test article 2.

Figure 3A:
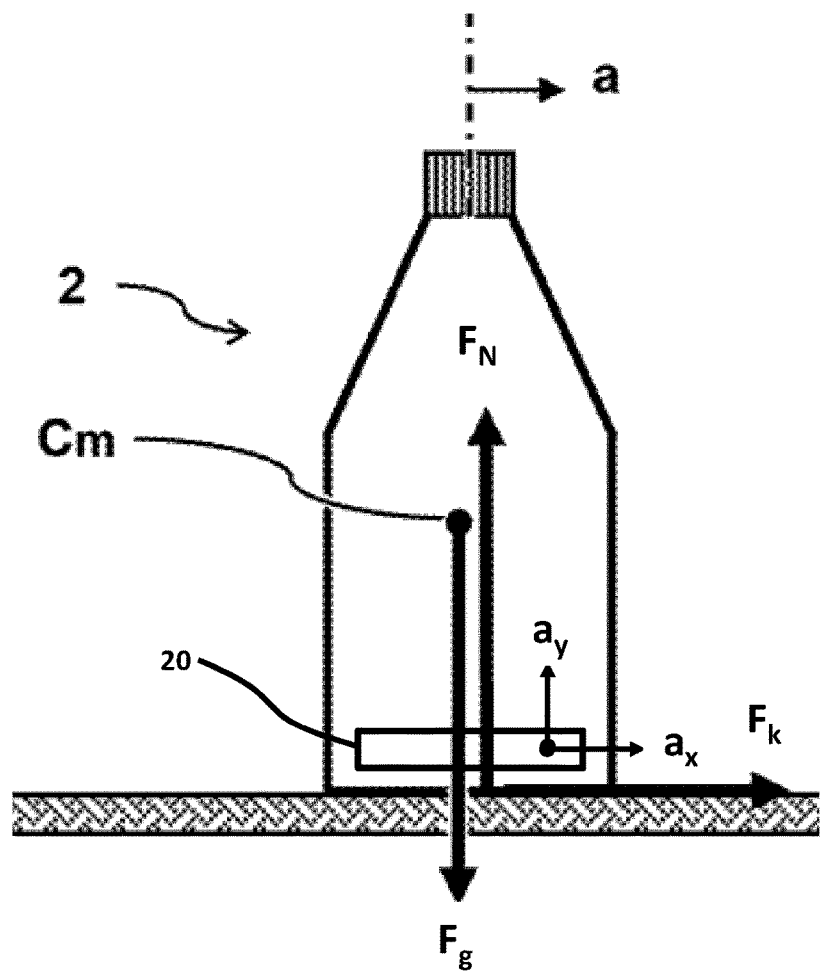
FIGS. 3A and 3B schematically show in greater detail a test article equipped with a sensor usable in a method and system according to an embodiment of the solution referred to in the present disclosure.
Figure 3B:
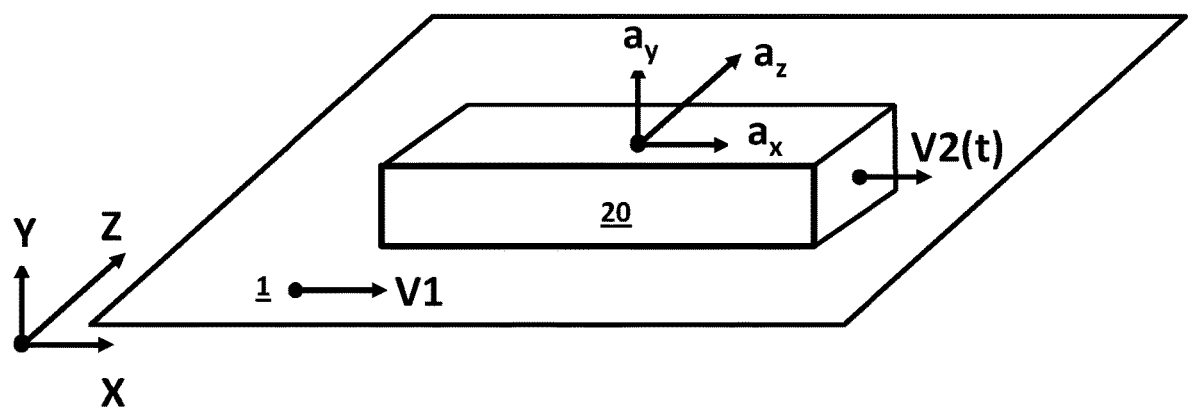
Figure 4:
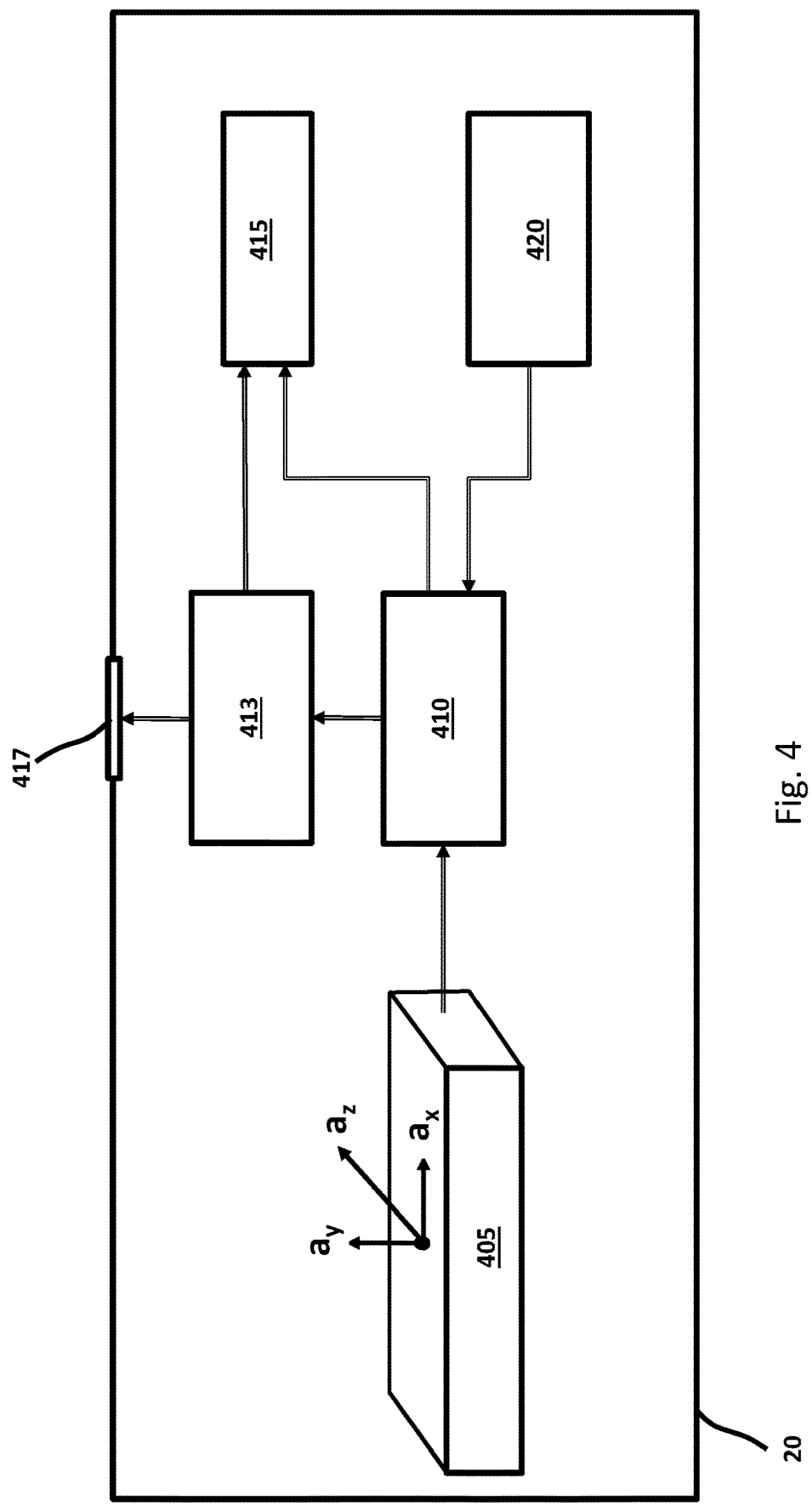
FIG. 4 is a functional block diagram of the sensor of the test article of FIGS. 3A and 3B, in an exemplary embodiment.

Referring now also to FIGS. 3A, 3B and 4, the sensor 20 with which the test article 2 is equipped is a sensor capable of measuring acceleration values.

In particular, the sensor 20 can be a sensor capable of measuring at least one acceleration value along an axis (single-axis or 1-axis acceleration sensor). If the test article 2 with the associated sensor 20 is resting, in particular supported, on the conveyor surface 1 so that the axis along which the sensor 20 is able to measure the acceleration value is an X axis parallel to the direction of movement (with speed V1) of the conveyor surface 1, the sensor 20 is able to measure the acceleration value $a_x$ (of the sensor 20 itself, and therefore of the test article 2 with which the sensor 20 is associated) along the direction of movement of the conveyor surface 1.

In embodiments, the sensor 20 can be a sensor capable of measuring acceleration values along at least two axes (two-axis or biaxial acceleration sensor). For example, if the test article 2 with the associated sensor 20 is resting, in particular supported, on the conveyor surface 1 so that the axes along which the sensor 20 is able to measure the acceleration value are the X axis parallel to the direction of movement of the conveyor surface 1, and a Z axis lying in a plane parallel to the plane of the conveyor surface 1 and orthogonal to the X axis, the sensor 20 is able to measure two acceleration values: the acceleration value $a_x$ mentioned above and an acceleration value $a_z$ along the direction Z coplanar and transverse to the direction of movement of the conveyor surface 1.

A sensor 20 capable of measuring an acceleration value along a single axis (single-axis or 1-axis acceleration sensor) is suitable in cases where the transported articles (and therefore the test article) are of such a nature that when they are placed on the conveyor surface 1 and during their transport the transported articles do not rotate on themselves (around an axis orthogonal to the conveyor surface 1). This is the case, for example, of articles consisting of packs (for example packs of bottles). By placing the test article 2 equipped with the sensor 20 on the conveyor surface 1 so that the axis along which the sensor 20 is able to measure the acceleration value is the X axis parallel to the direction of movement (with speed V1) of the conveyor surface 1, the sensor 20 measures the acceleration value $a_x$ (of the sensor 20 itself, and therefore of the test article 2 to which the sensor 20 is associated) along the direction of movement of the conveyor surface 1 for the entire travel covered by test article 2.

In cases where the transported articles are instead of such a nature that, during their transport, they may undergo rotations on themselves (around an axis orthogonal to the conveyor surface 1), it is preferable that the test article 2 is equipped with a sensor 20 capable of measuring acceleration values along at least two axes (two-axis or biaxial acceleration sensor) orthogonal to each other. By mounting the sensor 20 to the test article 2 so that, when the test article 2 is placed, in particular supported, on the conveyor surface 1, the axes along which the sensor 20 is able to measure the acceleration value lie in the plane of the conveyor surface 1, even if the acceleration measurement axes do not coincide with the X and Z axes (for example as a result of rotations on itself of the test article) it is possible to calculate the value of the acceleration (or deceleration) of the test article 2 with respect to the conveyor surface 1, by means of a simple vector sum of the acceleration values measured by the sensor 20 along the two axes.

In embodiments, the sensor 20 can be a sensor capable of measuring acceleration values along three axes (three-axis or triaxial acceleration sensor). For example, the sensor 20 is associated with the test article 2 in such a way that the axes along which the sensor 20 is able to measure the acceleration values are two axes orthogonal to each other lying in a plane parallel to the plane of the conveyor surface 1 (for example the X axis parallel to the direction of movement of the conveyor surface 1 and the Z axis lying in the plane parallel to the plane of the conveyor surface 1 and orthogonal to the X axis), and a Y axis orthogonal to the plane parallel to the plane of the conveyor surface 1 in which the X and Z axes lie. In this way, the sensor 20 is able to measure three acceleration values: for example, the acceleration values $a_x$ and $a_z$ mentioned above, and an acceleration value $a_y$ along the direction Y orthogonal to the plane of the conveyor surface 1.

Making joint reference to FIGS. 1 and 4, in embodiments the sensor 20 may include: an accelerometer 405, such as a single-axis (uniaxial or monoaxial) accelerometer or a biaxial accelerometer or a triaxial accelerometer, as described above; a data processor 410 coupled to the accelerometer 405 to receive the acceleration measurements from the latter; a memory 413, coupled to the data processor 410 (or possibly an internal memory of the data processor 410) for storing the acceleration measurements received by the accelerometer 405; a communication interface 415, for example of the Bluetooth type or other type of non-wired (wireless) communication, for short or medium range (for example WiFi), coupled to the data processor 410 and possibly to the memory 413, in particular wherein the communication interface 415 comprises a transmitter and a receiver 3 as discussed herein below in more detail. The data processor 410 is configured to receive the acceleration measurement values from the accelerometer 405 (along one, two or three axes), if necessary pre-process them and command the data transmission over the air to the communication interface 415. The memory 413 can be accessed from outside the sensor 20 via a connection port 417, for example a USB port, for reading and possibly downloading the acceleration measurements stored therein. In embodiments, the sensor 20 can also include a receiver 420 of a positioning system, coupled to the data processor 410, which will be discussed in greater detail hereinafter.

A monitoring system is associated with the transport system 100 to monitor the extent of the friction interaction between the test article 2 (representative of the articles to be transported) and the conveyor surface 1.

In embodiments, through the communication interface 415 the sensor 20 on board of the test article 2 can communicate with the monitoring system associated with the transport system 100. In embodiments, the monitoring system may include: a receiver 3, in particular as part of the communication interface 415, adapted to communicate with the communication interface 415 of the sensor 20 for, in particular, receiving data (transmitted by the transmitter as part of the communication interface 415 of the sensor 20) related to the acceleration measurements made by the accelerometer 405 of the sensor 20, possibly pre-processed by the data processor 410; an acceleration data processor 4 as part of a computing device configured to receive (from the receiver 3) and process (possibly by filtering) the acceleration values measured by the accelerometer 405 of the sensor 20, in order to obtain measurements of the acceleration of the test article 2; a friction coefficient controller 6 as part of a computing device configured to calculate, starting from the acceleration values measured by the accelerometer 405 of the sensor 20 and processed by the processor 4, a current kinetic friction coefficient value experienced by the test article 2 and to assess if the calculated value of the current kinetic friction coefficient falls within preset limits; and a friction coefficient adjustment device 7 controlled by a control signal S generated by the friction coefficient controller 6.

The friction coefficient controller 6 can be configured to compare the acceleration or deceleration of the test article 2 calculated starting from the acceleration measurements performed by the sensor 20 with a predetermined range of threshold acceleration values [$a_{min}$, $a_{max}$] and to adjust the control signal S fed to the friction coefficient adjustment device 7 based on the result of the comparison.

In embodiments, where for example the sensor 20 is not equipped with the communication interface 415 and/or the monitoring system is not equipped with the receiver 3, the acceleration measurements performed by the accelerometer 405 of the sensor 20 and stored in the memory 413 can be read from memory 413 and possibly downloaded and provided to the acceleration data processor 4 of the monitoring system (for example, at the end of a measurement campaign, by connecting the sensor 20 to the monitoring system via the port 417, or by sending the acceleration measurements stored in memory 413 in another way, for example over the air).

In embodiments, the friction coefficient adjustment device 7 can be configured to control the kinetic friction coefficient $\mu_k$ on the basis of the control signal S to keep the acceleration or deceleration of the test article 2 within the predetermined threshold range [$a_{min}$, $a_{max}$]. For example, the threshold range [$a_{min}$, $a_{max}$] is set to prevent overturning of the products, e.g. bottles or cans, and/or to prevent damage to the products, e.g. boxes or other containers. For example, the friction coefficient controller 6 can determine, on the basis of the acceleration (or deceleration) measurements of the test article 2 compared to the range of threshold acceleration values [$a_{min}$, $a_{max}$], if the kinetic friction coefficient $\mu_k$ is: lower than a first threshold value, corresponding to a well lubricated transport surface condition (for example $\mu_k \leq 0.08$); between the first threshold value and a second threshold value greater than the first threshold value, corresponding to a condition of poor lubrication of the transport surface (for example $0.08 \leq \mu_k \leq 0.18$); higher than the second threshold value and close to a critical value (for example equal to 0.23) for which it is known that the transported articles fall due to excessive friction with the conveyor surface 1.

In embodiments, the friction coefficient adjustment device 7 may include a lubricant dispenser configured for applying a variable amount of lubricant 8 to the conveyor surface 1 (and/or to the transported articles). Alternatively, or in addition, the friction coefficient adjustment device 7 may include a conveyor surface 1 cleaning device, e.g. a brush controllable to reduce friction by wiping the conveyor surface 1. Alternatively, or in addition, a cleaning fluid can be applied to the conveyor surface 1 and/or to the transported articles (to the portion thereof intended to rest on the conveyor surface 1). It will be appreciated that the cleaning of the conveyor surface can in some cases affect the current and/or future friction. For example, a timely cleaning to remove from the conveyor surface 1 residues of a drink spilled from a container can avoid the increase of the friction when the spilled drink dries by evaporation, leaving for example a sticky sugary residue.

In some embodiments, a separate lubricant and cleaning solution can be employed, for example an oil-based lubricant and/or a detergent solution based on soap. The use of specific substances depending on the circumstances (friction and/or spillage) can be more effective and prevent wastage. In some embodiments, the same substance can be used both for lubrication and for cleaning the conveyor surface 1. For example, a soap solution can act as a lubricant and/or as a cleaning solution. A blend of substances can also be used. Using a substance with a combined effect, the system can be simpler. Other reducing and/or detergents agents for the friction can also be used.

The application of lubricant on the transport surface 1 (by the friction coefficient adjustment device 7) is one of the possible countermeasures that can be taken in case, based on the acceleration measurements provided by the sensor 20 of the test article 2, it is assessed that the kinetic friction approaches the critical value. Other countermeasures may be: stopping the transport system (or part of it) to carry out cleaning/washing operations (for example when high horizontal accelerations are encountered even if a lubrication delivery phase had recently been activated); the stopping of the transport system (or part of it) for the replacement of damaged/worn modules of the conveyor belt (for example when vertical vibrations are detected—i.e. accelerations $a_z$—caused by jolts of the test article 2 which transits on discontinuities of the transport plane).

It is underlined that certain articles to be conveyed tolerate worse friction conditions before problems of falls appear during transport of the articles: with these articles it can be advantageous to save on the lubrication of transport chains. For example, it happens that in transport lines which are normally used to convey different types of containers, for example bottles, low and wide bottles remain upstanding even with friction coefficients up to 0.18. For other bottles, taller and narrower, thus having a center of gravity which is farthest from the conveyor surface 1, the friction should instead not exceed an indicative value of 0.12: for these latter bottles it will be preferable to command an automatic lubricant dispensing cycle as soon as the friction coefficient reaches the value of 0.10.

The threshold values of the friction coefficient may therefore be different for articles to be transported of a different nature. Also the friction coefficient threshold values may be different for different sections of the transport path. For example, it may happen that for a certain section of the transport path an acceleration value on the conveyor surface 1 which is higher than the acceleration value which, although lower, is unacceptable for another section of the transport path is less critical, for the same transported article. For example, a coefficient of friction of 0.12 could be the maximum acceptable limit for a certain section of the transport path, while in another section of the transport path the acceptability threshold can be raised to 0.16. This may depend for example on the speeds of the conveyor belts or chains, on the type of belt or chain, and on the layout of the conveyor line itself.

Figure 5:
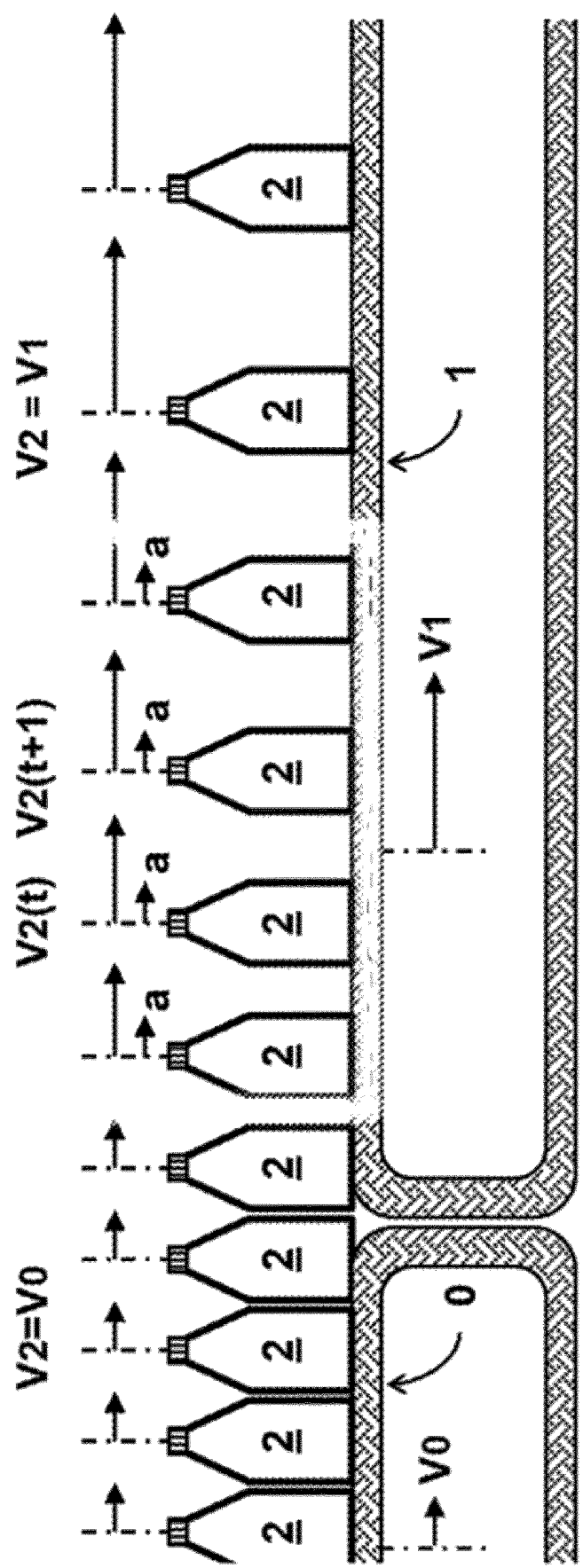
FIGS. 5 and 6 show two scenarios in which it is important to determine and possibly controlling the friction between transported articles and the transport surface for the same, and FIG. 7 schematically shows another embodiment of a articles transport system in accordance with the solution referred to in this disclosure.
Figure 6:
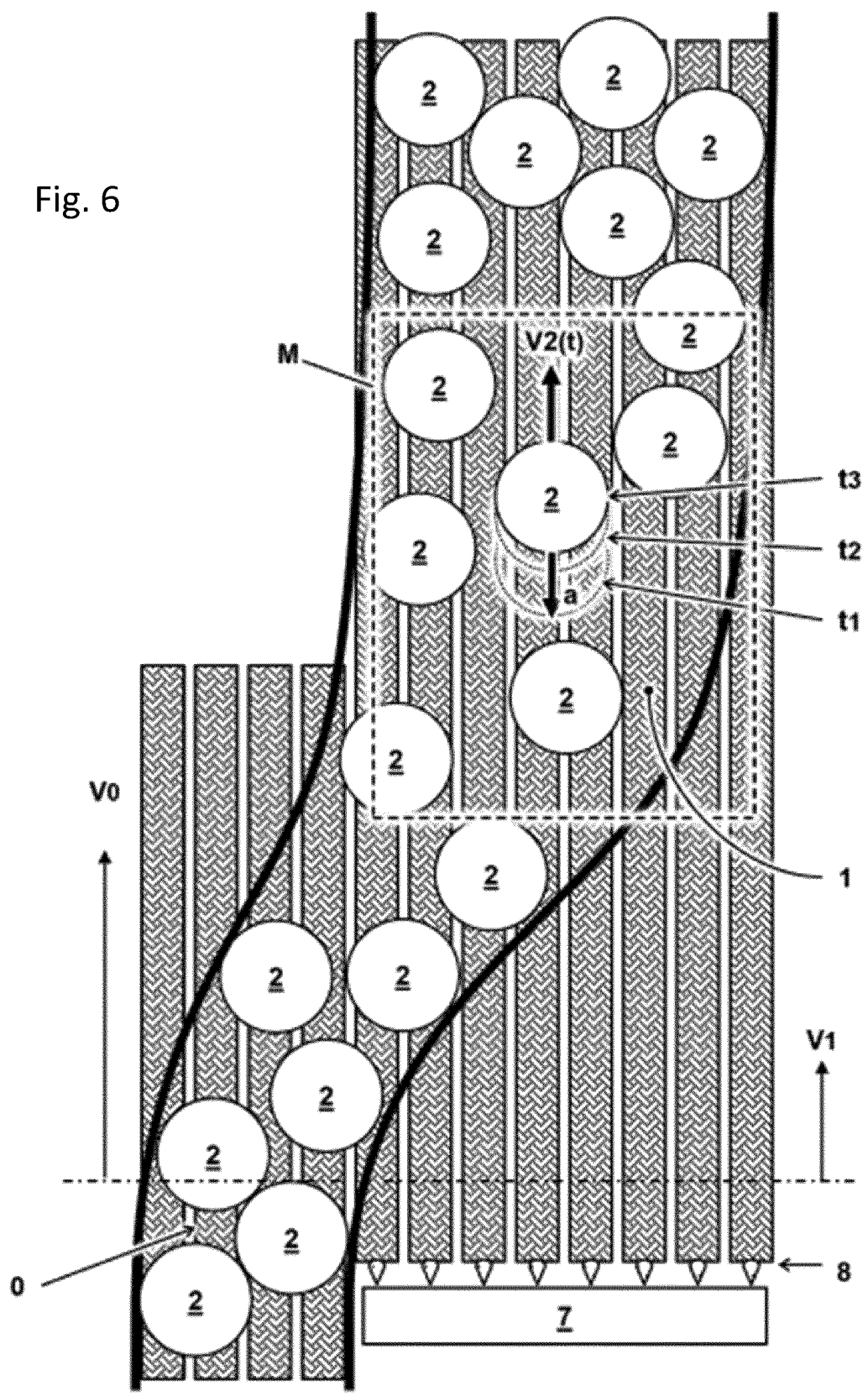

In addition to the scenario described in the introduction of the present description (articles transported by a conveyor belt reaching a collection unit), the solution described in this disclosure is also useful in scenarios such as those schematized in FIGS. 5 and 6, in which the transported articles, along the transport path, are moved from a conveyor belt moving at a first speed V0 to a conveyor belt moving at a second speed V1, which can be greater or less than the first speed V0.

In embodiments of the solution according to the present disclosure, where the sensor 20 on board the test article 2 is provided with the receiver 420 of a positioning system, the sensor 20 is further able to provide to the monitoring system associated with the transport system 100 position information of the test article 2 along the transport path of the transport system 100 (via the communication interface 415 or by storing the position information in the memory 415 together with the acceleration measurements). Such position information can advantageously be used to match the acceleration measurements of the test article 2 (from which an estimate of the friction coefficient can be derived) with the position of the test article 2 along the transport path.

The possibility of linking the acceleration measurements of the test article 2 to its position along a transport path is particularly useful in the case of transport systems comprising more than one conveyor belt, for example two or more conveyor belts, such as for example in the scenario of FIGS. 5 and 6.

In particular, the positioning system can be one of the well-known GPS, Galileo, GLONASS satellite geolocation systems, or an "indoor" positioning system. The latter option may be advantageous considering that the transport systems are normally installed indoor, for example on warehouses, where the signals radiated by the satellites of the constellation of the satellite positioning systems could hardly be received.

Indoor positioning systems are already known and commercially available.

In general terms, an "Indoor Positioning System" or "IPS" is a system used to locate objects (or people) in buildings, using lights, radio waves, magnetic fields, acoustic signals or other sensory data.

Known IPS are based on different technologies. One of these is the measure of the distance from nearby "anchor nodes" (the "anchor nodes" are nodes of the network whose spatial positions are fixed and known). A radio technology that can be used to obtain the measurement of the distance from the anchor nodes is the so-called "Ultra-Wide Band" ("UWB") technology.

Figure 7:
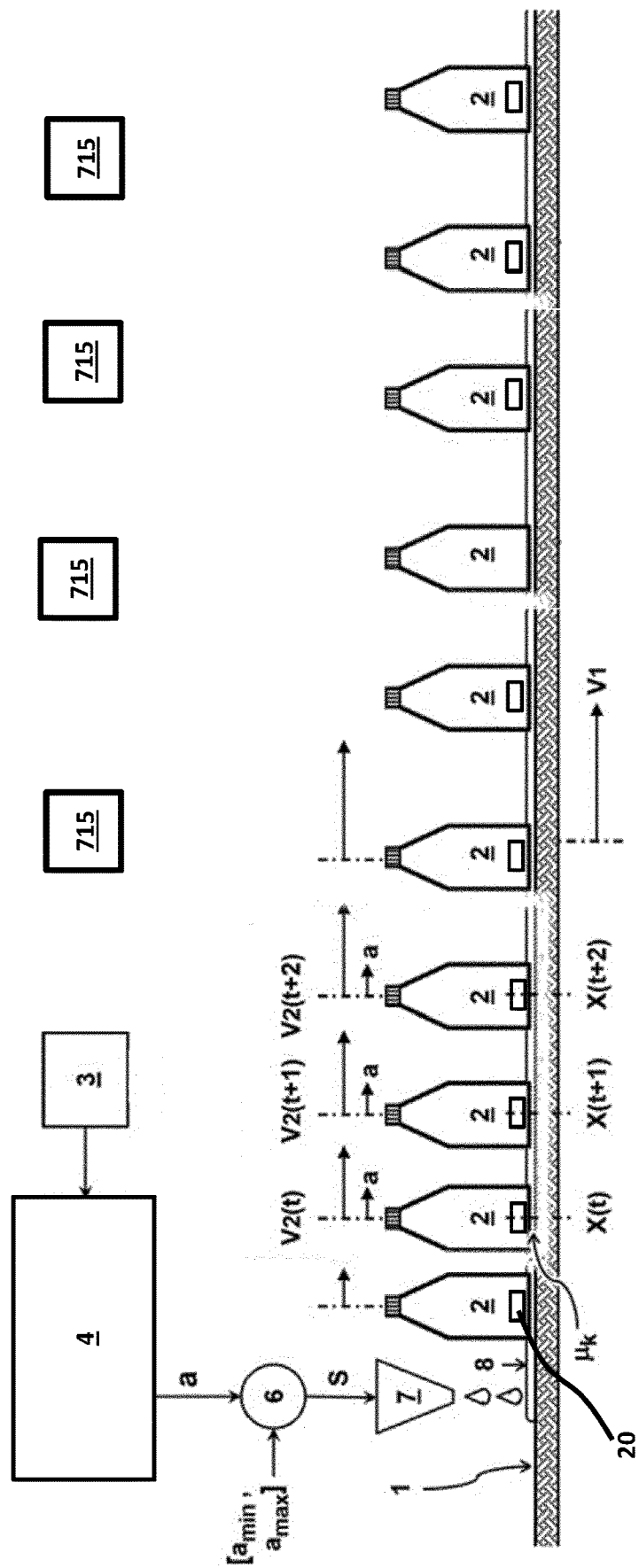

As schematically shown in FIG. 7, the transport system 100, or the environment in which the transport system 100 is installed, may have anchor nodes 715 deployed. The receiver 420 of the sensor 20 installed in the test article 2 is able to receive the signals radiated by the anchor nodes 715 and to determine a geographical position or location of the sensor 20 (and therefore of the test article 2) inside the environment in which the transport system 100 is installed. The location determined by the receiver 420 is sent to the monitoring system associated with the transport system 100 together with the acceleration measurements made by the sensor 20 (or/and the location is stored in the memory 415 together with the acceleration measurements). For example, each acceleration measurement sent by the sensor 20 to the monitoring system associated with the transport system 100 can be combined with location information of the sensor 20 corresponding temporally to the acceleration measurements themselves. In this way, the transport system 100 is able to "trace" a map of the transport path in which the related acceleration measures are associated with different points of the transport path.

As an alternative to (or in combination with) satellite tracking system or the "indoor" tracking system, a system based on electronic labels ("tags" or "transponders" or "electronic and proximity keys") of RFID ("Radio Frequency IDentification") type can also be used, preferably passive (which do not require batteries for their power supply), for example operating on frequencies of the order of one MHz. The receiver 420 on board the test article 2 could therefore be or include an electronic label, which can be intercepted at the passage of the test article 2 by fixed antennas installed in critical positions along the transport path (for example when the test article 2 reaches a distance of about 50 cm-1 m from the antenna). The electronic label to be installed on the test article 2 can also be a small adhesive similar to the anti-shoplifting labels that are applied to the products in some shops. When the test article 2 equipped with the electronic label is passing near one of the antennas located along the transport path, the antenna detects the test article and communicates to the monitoring system associated with the transport system 100 the transit of the test article 2. Knowing the position of the antenna, the monitoring system associated with the transport system 100 is able to deduce the position of the test article 2 and to associate the acceleration measurement transmitted by the test article 2 to its position along the transport path.

In embodiments of the solution of the present disclosure, a transport system for the transport of articles, such as for example the system 100 previously described, for example a bottling plant for liquids (drinks) can be equipped with a device for release configured to automatically release, for example upstream of a section deemed critical of the transport path, a test article 2; for example, the automatic release of the test article 2 can take place at a predetermined time, for example at the start of each work shift. At the end of the critical section of the transport path, the test article 2 could be "captured" automatically by a capture device capable of recognizing the test article 2 (among others transported articles), picking it up and removing it from the flow of the transported articles, and place it in a special test article collector waiting for the test article 2 to be returned, for example periodically, to a loader of the automatic release device. The automatic capture of the test article 2 could for example be possible thanks to a dimensional characterization of the test article 2. For example, the test article 2 may be lower than the other transported articles, even if equipped with the same foot support and the same mass (a possible lowering of the center of gravity is not detrimental to the proper acceleration detection by measure, since the acceleration or deceleration does not depend on the position of the center of gravity). For example, the test article 2, on its way along the transport path, comes into contact with the lateral guides for containing the articles near curved sections of the transport path, and in a position downstream of the critical section of the transport path to be monitored, a passage of suitable minimum height can be created so that it can be crossed by the test article 2. The test article 2 will be able to continue according to its own trajectory different from that (for example curved) imposed by the containment guides to the other transported articles, because it is characterized by a height, compared to the conveyor surface, lower than that of the containment guide. As mentioned, the use of a test article with a different center of gravity compared to the articles of the batch of articles to be transported (in the example cited, a test article lower than the transported articles) does not affect the acceleration measurements, provided that the test article has the same mass (and the same "footprint" resting on the conveyor surface 1 of the other transported articles). Once the friction coefficient thresholds have been established, a test article with a lower center of gravity can be used to monitor the acceleration values.

Thus is described a method for estimating the extent of a friction interaction between a transport surface of a conveyor of articles and articles transported on the transport surface, comprising:
providing a test article representative of the articles of a batch of articles which have to be transported by the conveyor of articles;
associating a sensor with the test article, said sensor comprising an acceleration sensor associated with the test article in such a way that the acceleration sensor is able to measure at least one acceleration along a direction lying in a plane parallel to a support plane of the test article;
placing the test article on the transport surface and having it transported by the conveyor of articles, so that the acceleration sensor measures at least one acceleration experienced by the test article along a direction lying in a plane parallel to the transport surface on which the test article rests;
acquiring measurements of said at least one acceleration along the direction lying in a plane parallel to the transport surface, and
estimating the extent of the friction interaction between the transport surface and the test article based on the acquired measurements of said at least one acceleration.

Advantageously, the method may further comprise:
associating with the conveyor of articles a monitoring system adapted to receive from the sensor associated with the test article the acceleration measurements performed by the acceleration sensor of the sensor associated with the test article when the test article is transported by the conveyor of articles, and means for estimating the extent of the friction interaction between the transport surface and test article based on the received acceleration measurements.

Optionally, the method may further comprise:
providing in the sensor associated with the test article a memory for storing the acceleration measurements performed by the acceleration sensor of the sensor associated with the test article when the test article is transported by the conveyor of articles, and
providing to the monitoring system associated with the conveyor of articles the acceleration measurements stored in memory.

Optionally, the method may comprise:
providing in the sensor associated with the test article a communication interface adapted to transmit the acceleration measurements performed by the acceleration sensor in wireless mode, and
providing in the monitoring system associated with the conveyor of articles a receiver adapted to receive in wireless mode from the communication interface of the sensor the acceleration measurements performed by the acceleration sensor.

Optionally, said test article representative of the articles in the batch of articles to be transported by conveyor of articles may be an article of the same material and/or of the same dimensions and/or of the same weight and/or having the same shape as the articles in the batch of articles.

In embodiments, the acceleration sensor is able to measure a first acceleration along a first direction lying in a plane parallel to said support plane of the test article (i.e., a first direction lying in a plane parallel to the transport surface when the test article is placed on it).

In embodiments, the acceleration sensor is able to measure a second acceleration along a second direction lying in said plane parallel to said support plane of the test article (i.e., a plane parallel to the transport surface when the test article is supported on it) and oriented transversely to the first direction.

In embodiments, the acceleration sensor is capable of measuring a third acceleration along a third direction orthogonal to said support plane of the test article (i.e., a third direction orthogonal to a plane parallel to the transport surface when the test article rests on it).

Advantageously, the method may further comprise controlling the friction coefficient on the basis of information received from said means for estimating the value of the friction coefficient, said controlling the friction coefficient comprising keeping the acceleration or deceleration of the test article within a predetermined range.

Optionally, said controlling the friction coefficient may include distributing lubricant on the transport surface and/or on the articles that have to be transported and/or cleaning the transport surface and/or the articles to be transported.

Optionally, said controlling the friction coefficient may include cleaning the transport surface and/or requesting a replacement of the component of the conveyor of articles defining the transport surface.

Advantageously, the method may further comprise:
detecting the position of the test article along a transport path of the conveyor of articles, and
associating the detected position of the test article with the acceleration measurements performed from the acceleration sensor of the sensor associated with the test article.

Thus is further described a system for estimating a friction coefficient between a transport surface of a conveyor of articles and articles transported on the transport surface, comprising:
a test article representative of the articles in a batch of articles that have to be transported by the conveyor of articles;
a sensor associated with the test article, said sensor comprising an acceleration sensor associated with the test article in such a way that the acceleration sensor is able to measure at least one acceleration along a direction lying in a plane parallel to a support plane of the test article;
means for acquiring measurements of said at least one acceleration performed by the acceleration sensor of the sensor associated with the test article when, in use, the test article rests on the transport surface and is transported by the conveyor of articles, and for estimating the extent of the friction interaction between the transport surface and the test article based on the acquired measurements of said at least one acceleration.

An advantage of the solution according to the present disclosure is that it does not require particularly expensive equipment such as for example cameras and image processors.

Another advantage of the solution according to the present disclosure is that its implementation may not require any adaptation of the transport system.

Another advantage of the solution according to the present disclosure is that it allows the monitoring of the acceleration of the transported articles, and therefore the estimation of friction, not only in a limited measuring area, but potentially along the entire transport path of the articles.

The invention claimed is:

1. Method for estimating the extent of a friction interaction between a transport surface of a conveyor of articles and articles transported on the transport surface, comprising:
    providing a test article representative of the articles of a batch of articles which have to be transported by a conveyor of articles;
    associating a sensor with the test article, said sensor comprising an acceleration sensor associated with the test article that is arranged to measure at least one acceleration along a direction lying in a plane that is oriented relative to a support plane of the test article;
    supporting the test article on a moving transport surface of the conveyor of articles;
    acquiring measurements of the at least one acceleration experienced by the test article being supported on the moving transport surface with the acceleration sensor; and
    estimating the extent of a friction interaction between the moving transport surface and the test article based on the acquired measurements of the at least one acceleration.

2. Method according to claim 1, wherein the acceleration sensor of the sensor associated with the test article is arranged to measure the at least one acceleration along a direction lying in the plane oriented parallel to the support plane of the test article defined by the moving transport surface, in particular wherein the acceleration sensor is arranged to measure a first acceleration along a first direction and/or a second acceleration along a second direction lying in the plane oriented parallel to said support plane of the test article.

3. Method according to claim 1, wherein the acceleration sensor of the sensor associated with the test article is arranged to measure the at least one acceleration along a direction lying in the plane oriented orthogonal to the support plane of the test article defined by the moving transport surface, in particular wherein the acceleration sensor is arranged to measure a third acceleration along a third direction in the plane oriented orthogonal to said support plane of the test article.

4. Method according to any of claim 1, further comprising:
    associating with the conveyor of articles a monitoring system adapted to receive from the sensor associated with the test article the acceleration measurements performed by the acceleration sensor of the sensor associated with the test article when the test article is transported by the conveyor of articles, and a computing device for estimating the extent of the friction interaction between the moving transport surface and the test article based on the received acceleration measurements.

5. Method according to claim 4, comprising:
    storing the acceleration measurements performed by the acceleration sensor of the sensor associated with the test article in a memory associated with the sensor when the test article is transported by the conveyor of articles, and
    providing to the monitoring system associated with the conveyor of articles the acceleration measurements stored in the memory.

6. Method according to claim 4, comprising:
    transmitting the acceleration measurements performed by the acceleration sensor in wireless mode, in particular through a transmitter associated with the sensor, and
    receiving the transmitted acceleration measurements performed by the acceleration sensor in wireless mode, in particular in a receiver of the monitoring system, preferably wherein the transmitter and/or receiver form part of a communication interface.

7. Method according to claim 1, wherein said test article representative of the articles in the batch of articles to be transported by conveyor of articles is an article of the same material and/or of the same dimensions and/or of the same weight and/or having the same shape as the articles in the batch of articles.

8. Method according to claim 1, further comprising controlling the extent of the friction interaction between the moving transport surface and the test article on the basis of information obtained by estimating the extent of the friction interaction between the moving transport surface and the test article, said controlling the extent of the friction interaction between the moving transport surface and the test article comprising keeping the acceleration or deceleration of the test article within a predetermined range.

9. Method according to claim 8, wherein said controlling the extent of the friction interaction between the moving transport surface and the test article includes distributing lubricant on the moving transport surface and/or on the articles that have to be transported and/or cleaning the moving transport surface and/or the articles to be transported.

10. Method according to claim 8, wherein said controlling the extent of the friction interaction between the moving transport surface and the test article includes cleaning the moving transport surface and/or requesting a replacement of the component of the conveyor of articles defining the moving transport surface.

11. Method according to claim 8, further comprising:
    associating with the conveyor of articles a monitoring system adapted to receive from the sensor associated with the test article the acceleration measurements performed by the acceleration sensor of the sensor associated with the test article when the test article is transported by the conveyor of articles, and a computing device for estimating the extent of the friction interaction between the moving transport surface and the test article based on the received acceleration measurements,
    wherein the value of the extent of the friction interaction between the moving transport surface and the test article is estimated by means of said computing device for estimating the extent of the friction interaction between the moving transport surface and the test article based on the received acceleration measurements.

12. Method according to claim 1 further comprising:
    detecting the position of the test article along a transport path of the conveyor of articles, and associating the detected position of the test article with the acceleration measurements performed from the acceleration sensor of the sensor-associated with the test article.

13. System for estimating the extent of a friction interaction between a transport surface of a conveyor of articles and articles transported on the transport surface, comprising:
a test article representative of the articles in a batch of articles that have to be transported by the conveyor of articles;
a sensor associated with the test article, said sensor comprising an acceleration sensor associated with the test article that is arranged to measure at least one acceleration along a direction lying in a plane that is oriented relative to a support plane of the test article;
a monitoring system for acquiring measurements of said at least one acceleration performed by the acceleration sensor of the sensor associated with the test article when, in use, the test article is supported on a moving transport surface of the conveyor of articles, and
a computing device associated with the monitoring system for estimating the extent of a friction interaction between the transport surface and the test article based on the acquired measurements of the at least one acceleration.

14. System according to claim 13, wherein the sensor comprises a memory for storing the acceleration measurements.

15. System according to claim 12, further comprising a transmitter associated with the sensor that is configured to transmit the acceleration measurements performed by the acceleration sensor, in particular in wireless mode, and a receiver associated with the monitoring system that is configured to receive the acceleration measurements transmitted by the transmitter, in particular in wireless mode.

16. System according to claim 13, comprising a controller and a friction coefficient adjustment device controlled by the controller based on the estimated extent of the friction interaction between the transport surface and the test article.

17. System according to claim 13, comprising a tracking system that is configured to track a position of the sensor along a transport path of the conveyor of articles.

18. A test article representative of articles of a batch of articles that are to be transported by a conveyor of articles comprising an article of the same material, dimensions, weight and/or shape as the articles in the batch of articles, provided with a sensor comprising an acceleration sensor that is arranged to measure at least one acceleration along a direction lying in a plane that is oriented relative to a support plane of the test article.

* * * * *

UNITED STATES PATENT AND TRADEMARK OFFICE
CERTIFICATE OF CORRECTION

PATENT NO. : 11,940,373 B2
APPLICATION NO. : 17/423329
DATED : March 26, 2024
INVENTOR(S) : Andrea Andreoli et al.

It is certified that error appears in the above-identified patent and that said Letters Patent is hereby corrected as shown below:

In the Claims

Claim 4, Column 17, Line 56, "to any of claim" should be --to claim--.

Signed and Sealed this
Eleventh Day of June, 2024

*Katherine Kelly Vidal*

Katherine Kelly Vidal
*Director of the United States Patent and Trademark Office*